Patented Sept. 16, 1941

2,255,901

UNITED STATES PATENT OFFICE 2,255,901

METHOD OF PRODUCING GLAZED CHINTZ

Paul C. Schroy, Darien, Conn., assignor to American Cyanamid Company, New York, N. Y., a corporation of Maine No Drawing. Application April 5, 1939,
Serial No. 266,136

2 Claims. (Cl. 91—70)

This invention relates to the production of improved glossy finishes on textile goods such as glazed chintz.

An object of this invention is to improve the chemical resistance and permanency of glossy textile finishes such as glazed chintz finishes. Another object of this invention is to improve the appearance and gloss characteristics of chintz finishes.

These and other objects are attained by the application of finishing compositions containing resins produced by condensing formaldehyde with an aminotriazine or condensed aminotriazone. Among these amino compounds melamine and its derivatives such as 2,4,6-triethyl-and-triphenyl-triamino-1,3,5 triazines, 2,4,6-trihydrazino-1,3,5-triazine and the corresponding condensed triazines such as melam and melem are preferred. Among the other triazine compounds which may be used the following are included: triazines containing one or two amino groups such as ammeline, ammelide, formoguanamine, 2-amino-1,3,5-triazine and their substitution products as well as nuclear substituted aminotriazines such as 2-chloro-4,6-diamino-1,3,5-triazine, 2 - phenyl-4-amino - 6 - hydroxy - 1,3,5-triazine, 6-methyl-2,4-diamino - 1,3,5 - triazine. Obviously commercial mixtures of the various triazines or mixtures thereof with other amino compounds may be used if desirable. One example of such commercial mixtures is the product obtained by heating dicyandiamide sufficiently to obtain a significant amount of melamine, together with other reactive amino bodies.

The aminotriazines mentioned above are preferably condensed with formaldehyde but any suitable aldehyde of the aliphatic, aromatic or heterocyclic series may be used such as acetaldehyde, propionaldehyde, butyraldehyde, hexaldehyde, heptaldehyde, crotonaldehyde, allylaldehyde, benzaldehyde, cinnamylaldehyde, furfural, etc.

The condensation products may be produced by any suitable process and with any desired combining ratio of aldehyde to aminotriazine from 1:1 up to 6:1, or even higher. Furthermore the condensation products may be alkylated if desired with any of the lower alcohols such as butanol, amyl alcohol, cylohexanol, etc.

While resins produced by condensing formaldehyde with an amino-triazine or condensed aminotriazine give excellent results, it may be desirable to incorporate therewith other resins such as urea-formaldehyde resin, dicyandiamide-formaldehyde resin, thiourea-formaldehyde resin, mixed urea-thiourea-formaldehyde resins, etc. These resins may be made separately and then mixed in the treating compositions or the mixed resins may be formed simultaneously by reacting formaldehyde with a mixture containing an aminotriazine and with one or more of the other amido substances. Mixed resins suitable for use according to this invention are those containing a substantial proportion of aminotriazine e. g. at least about 20% of the total amido material. It is necessary to have a substantial proportion of amino-triazine in order to obtain the high chemical and water resistance which distinguish my new finishes from finishes previously produced. If desirable, phenol-formaldehyde resins may also be admixed with the other resinous materials.

The following examples are given by way of illustration and not in limitation.

EXAMPLE 1

| | Parts by weight |
|---|---|
| Melamine resin syrup A | 1 |
| Secondary butanol | 2 |
| Water | 2 |

There is preferably added to the above mixture a suitable softener such as a compatible stearic acid compound and also an acid accelerator preferably of the delayed action type. About 3% of a softener based on the total solution and about 3% of the accelerator based on the resin syrup are usually sufficient. The chintz material is treated with this solution, run through squeeze rollers and dried at about 90° C. In order that a good finish may be produced upon subsequently calendering the cloth it may be only partially dried, leaving a small amount of water in the cloth. If the cloth be completely dried, it may be desirable to apply moisture to the cloth before calendering by means of a water box, sprays or any other suitable means in order to obtain high gloss upon calendering. For this purpose about 5%–15% of moisture is suitable. The dried or partially dried cloth is calendered on rolls at least one of which is maintained at a temperature sufficient to heat the cloth during the calendering operation to about 130°–160° C. thereby producing the glaze and also at least partially curing the impregnated resin. If the resin is not completely cured, the cloth may then be passed through a heating unit maintained at about 140°–160° C. for about one to five minutes, thereby completing the curing of the resin and producing a permanent finish. This finish will permit washing in warm soapy water without materially affecting the permanency of the finish.

EXAMPLE 2

*Preparation of resin syrup A*

|  | Parts by weight |
|---|---|
| Formalin (40% formaldehyde in aqueous solution) | 305 |
| Melamine | 235 |

This composition is refluxed at a pH between about 8.5 and about 9 for two to three hours. The resulting syrup is cooled and to each 100 parts thereof there is added about 30 parts of an aqueous solution containing about 50% isopropanol.

EXAMPLE 3

*Preparation of resin syrup B*

|  | Parts by weight |
|---|---|
| Formalin (40% of formaldehyde in aqueous solution) | 650 |
| Urea | 185 |
| Melamine | 165 |

This mixture is neutralized to a pH of about 7 with caustic, triethanolamine or other suitable base and is reacted for about two and one half to three hours at about 30° C. and then for one to one and one half hours at about 60° C. The syrup is cooled and may be diluted if desirable in the same manner as indicated in Example 2. This dilute resin syrup may be substituted for resin syrup A in Example 1. Obviously the condensation of the urea, melamine and formaldehyde may be conducted under other conditions, such as at higher temperatures and for different lengths of time.

Example 4

A urea resin is prepared by refluxing 2 mols of formaldehyde in aqueous solution with 1 mol of urea preferably under substantially neutral conditions for about three hours and continued for about one to two hours under acid conditions e. g. pH 4.5–6. The resin syrup is neutralized to pH 7 and may be diluted to give a suitable viscosity. This resin syrup may be substituted for up to about 80% of resin syrup A in Example 1.

In order to produce particularly good finishes the resin syrup may have admixed therewith various gums, waxes, alginates, etc., to prevent too much penetration of the resin into the fabric. The following substances are included in this group of materials: locust bean gum, gum tragacanth, tapioca paste, the alginates e. g. sodium alginate, proteins such as albumin, wheat gluten, casein, etc.

Any suitable accelerator may be used to promote the curing of the resin but an accerator of the delayed action type e. g. the reaction product of triethanolamine with an acid substance such as phthalic anhydride, phthalic acid, tartaric acid, phosphoric acid, etc. Such an accelerator may be produced, for example, by reacting phthalic acid in water with triethanolamine at about 65° C. to produce a neutral product. If an accelerator of this type be used, the resin will remain somewhat plastic during the hot calendering operation, the final cure in a suitable heat compartment serving to set the resin completely. Better finishes are usually obtained if the resin be somewhat plastic during a large portion of the calendering operation. If on the other hand an accelerator of the more conventional type such as the reaction product of monoethanolamine with phthalic acid, diammonium phosphate, etc., be used, a resin will be almost completely cured on the calendering rolls and will, therefore, require little or possibly no subsequent heat treatment.

In order to remove any trace of free acid or other impurity the finished cloth is preferably washed with warm dilute soap and soda ash solution. Such washing operations are helpful in avoiding subsequent tendering of the fabric and eliminating odors by decomposition of the resin by means of the acid during storage. Furthermore the dyes on the cloth may be sensitive to the free acid or the other impurities which may be present and, therefore, light fastness and stability of the dyes are generally improved by washing the finished fabric. After washing, the cloth is dried and if desirable may be calendered again.

The impregnating or coating compositions may be applied to the cloth in any suitable manner. They may be applied, for example, by the use of padder rolls, the lower one of which dips into the treating solution. Another method of treating the fabric is to merely coat one side as by spraying, by reverse roll coating, or by any other suitable means. This latter method is sometimes desirable in that very impervious films are obtained, thereby resulting in high chemical and water resistance. The resin syrups may be diluted with diluents such as secondary butanol, ethanol, isopropanol, etc. (preferably aqueous solutions thereof) in order to obtain desired concentrations, viscosity, stability, etc.

The concentration of resin solids in the treated cloth preferably should be between about 5% and about 25% by weight. Obviously the concentration of resin solids depends somewhat on whether the cloth is merely coated or impregnated throughout. Furthermore the concentration of resin in the cloth depends somewhat on the texture, the density of the weave, and "weight" of the cloth which is used. The concentration of resin solids in the cloth will also vary according to the type of glaze that is desired i. e. heavy or light glaze.

After treating the cloth with the resin syrup composition it is dried at least partially desirably at about 60°–110° C. If the cloth be dried completely, it is preferably humidified by any suitable means before the glazing treatment. The glazing operation may be conducted by running the impregnated cloth through a glazer in which the rolls revolve at substantially the same speed and wherein the temperature is so maintained that the cloth will be heated to about 130°–160° C. during its passage through the calender. The pressure in the calender is maintained at about four to six tons per square inch or at even higher pressures. The cloth may be run through the calender one or more times depending upon the degree of glaze required. Another method of obtaining a glazed finish which gives a higher gloss than the method just described is to run the treated cloth through an apparatus in which the top metal roll is heated to a temperature sufficient to heat the cloth to about 130°–160° C., the middle being the usual husk roll and the bottom roll another metal roll. As a general rule only the top roll is heated and the top roll operates at a speed somewhat higher than that of the husk roll.

Obviously many modifications in the processes and compositions described above may be made without departing from the spirit and scope of the invention as defined in the appended claims.

I claim:

1. A process of preparing glazed chintz which comprises treating a chintz material with a sufficient amount of an aqueous solution including a triethanolamine salt of phthalic acid as an accelerator of the delayed action type and a thermosetting resin containing the condensation products of formaldehyde with melamine to provide a concentration of resin solids in the treated cloth between about 5% and 25% by weight, adjusting the moisture content to about 5-15%, glazing the material and curing the thermosetting resin with heat.

2. A process of preparing glazed chintz which comprises treating a chintz material with a sufficient amount of an aqueous solution including a triethanolamine salt of phthalic acid as an accelerator of the delayed action type and a thermosetting resin containing the condensation products of formaldehyde with melamine to provide a concentration of resin solids in the treated cloth between about 5% and 25% by weight, partially drying the treated cloth to a moisture content of about 5-15%, glazing the cloth and curing the thermosetting resin with heat.

PAUL C. SCHROY.